US008622341B2

(12) United States Patent
Marechal

(10) Patent No.: US 8,622,341 B2
(45) Date of Patent: Jan. 7, 2014

(54) SUSPENSION RUDDER BAR FOR AN AIRCRAFT TURBOJET AND A SUSPENSION WITH FAN HANGER PROVIDED THEREWITH

(75) Inventor: Yoann Marechal, Dommarie les Lys (FR)

(73) Assignee: SNECMA, Paris (FR)

( * ) Notice: Subject to any disclaimer, the term of this patent is extended or adjusted under 35 U.S.C. 154(b) by 202 days.

(21) Appl. No.: 13/087,693

(22) Filed: Apr. 15, 2011

(65) Prior Publication Data

US 2011/0259997 A1 Oct. 27, 2011

(30) Foreign Application Priority Data

Apr. 21, 2010 (FR) ...................................... 10 53037

(51) Int. Cl.
*B64D 27/00* (2006.01)
(52) U.S. Cl.
USPC ................... 244/54; 248/554; 60/796; 60/797
(58) Field of Classification Search
USPC ................ 244/54; 60/796, 797; 248/554–557
See application file for complete search history.

(56) References Cited

U.S. PATENT DOCUMENTS

| 5,725,181 | A | 3/1998 | Hey | |
|---|---|---|---|---|
| 7,021,585 | B2 * | 4/2006 | Loewenstein et al. | 244/54 |
| 7,108,224 | B2 * | 9/2006 | Pasquer et al. | 244/54 |
| 7,445,179 | B2 * | 11/2008 | Diochon et al. | 244/54 |
| 7,448,573 | B2 * | 11/2008 | Lafont et al. | 244/54 |
| 2004/0251379 | A1 * | 12/2004 | Pasquer et al. | 244/54 |
| 2004/0251380 | A1 * | 12/2004 | Pasquer et al. | 244/54 |
| 2005/0067528 | A1 * | 3/2005 | Loewenstein et al. | 244/54 |
| 2007/0069068 | A1 * | 3/2007 | Lafont et al. | 244/54 |
| 2007/0069069 | A1 * | 3/2007 | Diochon et al. | 244/54 |
| 2010/0127118 | A1 | 5/2010 | Combes et al. | |
| 2010/0176239 | A1 | 7/2010 | Marche | |
| 2010/0181417 | A1 | 7/2010 | Combes et al. | |

FOREIGN PATENT DOCUMENTS

| EP | 0 805 108 A2 | 11/1997 |
|---|---|---|
| FR | 2 915 177 | 10/2008 |
| FR | 2 916 736 | 12/2008 |
| FR | 2 917 713 | 12/2008 |
| FR | 2 920 138 | 2/2009 |

OTHER PUBLICATIONS

French Preliminary Search Report issued Nov. 26, 2010, in French 10 53037, filed Apr. 21, 2010 (with English Translation of Category of Cited Documents).

* cited by examiner

*Primary Examiner* — Philip J Bonzell
(74) *Attorney, Agent, or Firm* — Oblon, Spivak, McClelland, Maier & Neustadt, L.L.P.

(57) ABSTRACT

A suspension rudder bar has the shape of a bar with a transversal axis (Y'Y), symmetrical with respect to a plane ($P_S$) intersecting the rotation axis (X'X) of the engine, and includes links with transmission connecting rods between a rear casing for ejecting gases and a front casing hub of the fan, and a central link to a fastening fixation to an engine fastening pylon. The links of the rudder bar to the transmission connecting rods are arranged on the transversal ends of the rudder bar, and the rudder bar extends, perpendicularly to the axis of the bar (Y'Y), with spars over a sufficient portion and at a determined distance from the edges of the plate to act as an abutment to the plate in the case of a torsion around the central link or of a connecting rod breaking.

10 Claims, 4 Drawing Sheets

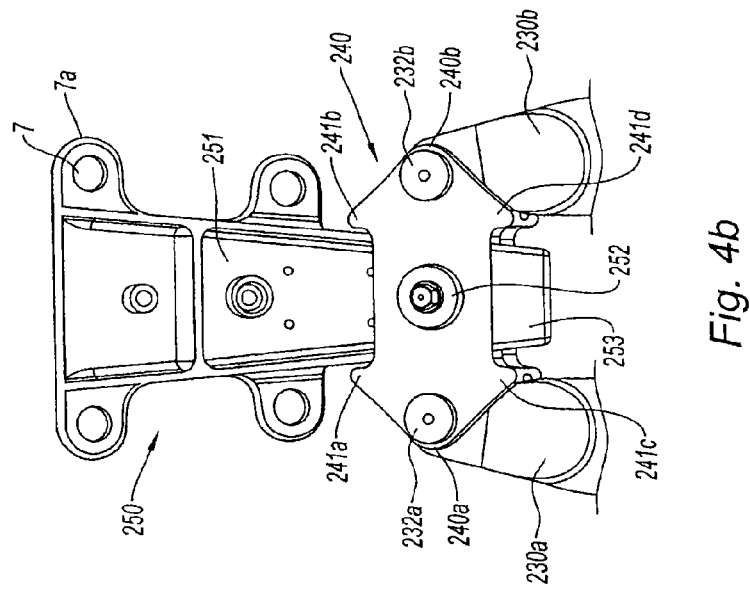
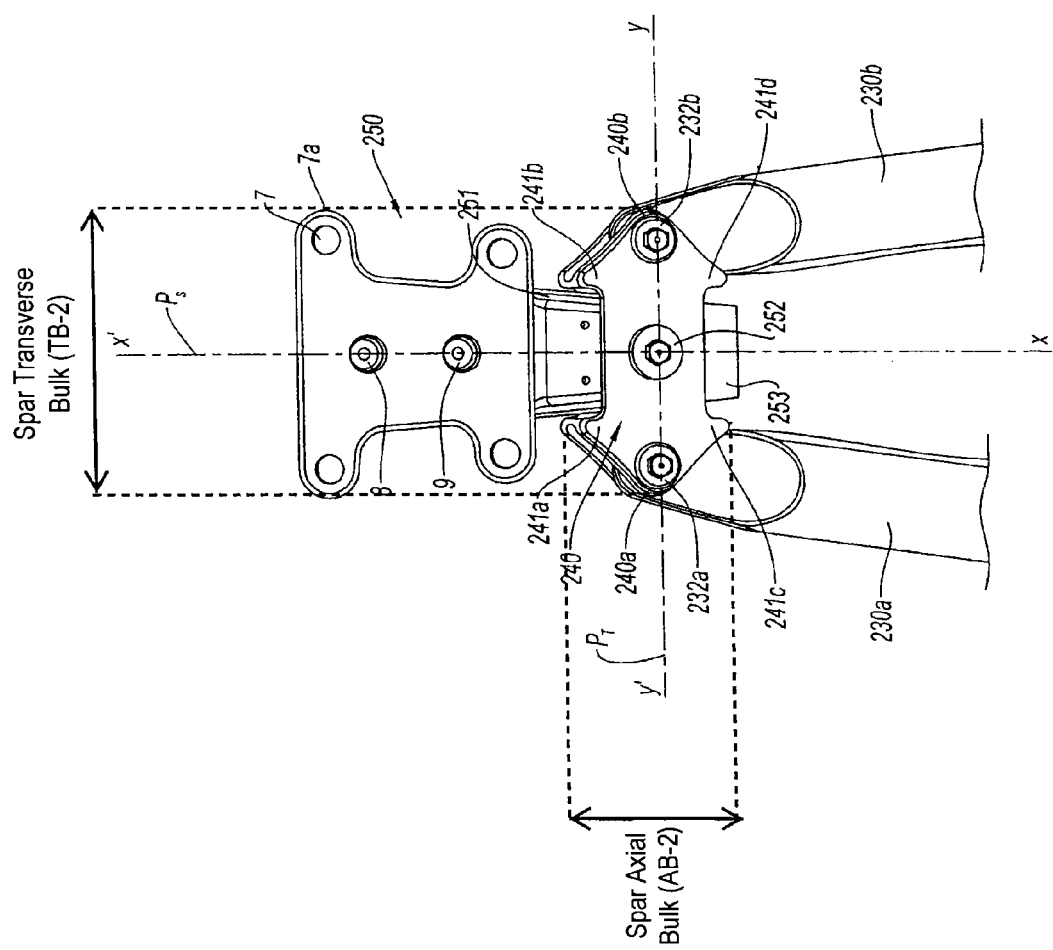

SUSPENSION RUDDER BAR FOR AN AIRCRAFT TURBOJET AND A SUSPENSION WITH FAN HANGER PROVIDED THEREWITH

BACKGROUND OF THE INVENTION

I. Field of the Invention

This invention relates to a suspension rudder bar for an aircraft turbojet with fan hanger, as well as an engine suspension with fan hanger provided with such a rudder bar.

II. Description of Related Art

As illustrated in the side view of FIG. 1, a fan turbojet comprises an air intake 10 extended with a large diameter front casing 11 housing the fan, such a casing being followed downstream with several primary flow casings 12 to 15—with substantially lower diameters—accommodating the compression stages, the combustion chamber, the expansion stages in the turbines and the ejection nozzles. The diameters of the primary flow casings could overall increase slightly from upstream to downstream, that is from the compressors up to the ejection nozzles.

The incoming air is compressed in the fan, then divided in concentric flows, i.e. the primary flow surrounded with a secondary flow. The primary flow is compressed in the compression stages, mixed with a fuel in the combustion chamber for supplying hot gases, then expanded in the turbines so as to drive into rotation the fan and the compression stages, and then ejected for supplying a thrust. But most part of the thrust is formed by the secondary flow being directly ejected either in combination or separately from the primary flow. The flow rate ratio between the two secondary and primary flows, referred to as the dilution rate, enables to increase the engine power. Now, a high ratio between diameters of the fan casing 11 and the primary flow casings 12 to 15 helps to increase the dilution rate.

An engine suspension, generally under a wing, allows the engine load to be transferred to the aircraft by an appropriate intermediary supporting structure. Conventionally, such a support is a rigid pylon 20 with an oblong shape, on which the engine hanging is made with external ferrules of the structural casings: one fastener 21 with the front casing 11 and one rear fastener 22 with the ejection casing 15.

Suspensions are generally designed so as to be <<fail-safe>>, that is able to prevent the aircraft engine from being detached. Such suspensions enable to manage different types of loads: vertical (weight of the engine), axial (thrust), lateral (wing buffeting) loads and torsions (induced by the engine rotating or by a turbine blade being lost). Such suspensions should be able to also accommodate thermal expansions and contractions of the engine, in particular at cruising speed. Such thermal variations induce a not insignificant change in the direction of loads acting on the suspensions.

In <<fail-safe>> isostatic suspensions, the front 21 and rear 22 fasteners comprise rod links 23 and knee links 24 (also see FIG. 2) on the casings 15 and 11, operating in tension in vertical planes perpendicular to the rotation axis X'X of the engine. The loads and the moments between the engine and the pylon are thus transmitted according to the operational reference plane—formed by the rotation axis X'X of the engine, a transversal axis Y'Y and a vertical axis Z'Z–. Such a suspension is for example described in Patent FR 2,925,016.

The fail-safe suspension more specifically comprises connecting rods 30 or other thrust transmission frames between the hub 11a of the front casing 11 and the rear fastener 22 of the ejection casing 15 on the pylon 20, or directly on such a pylon, in the vicinity of the rear fastener.

The top view of FIG. 2 more accurately shows the connecting rods 30a and 30b mounted by knee links 32a, 32b on a rudder bar 40, being itself hinged by a knee link 41 on a central tongue 50 of a plate 51 fastened, as illustrated on FIG. 1, on the rear fastener 22. In such architectures, the rudder bar 40 has a transversal width such that it also enables links 52a, 52b, beyond the connecting rod links 30a, 30b, with lateral extensions 53a, 53b of the plate 51. Should a connecting rod break, for example the connecting rod 30b, the plate 51 rotates anti-clockwise and the play between the extension 52a and the connecting rod 30a is consumed: forces will then be transmitted through the linking knee 32a of the remaining connecting rod 30a.

However, because of the large transversal width of the rudder bar, being needed for integrating all the links to the plate and to the connecting rods, a large master-couple could be generated in the case of a connecting rod break or of a tension on the fastener or the pylon. Moreover, such large transversal bulk solutions prohibit implementing thin aerodynamic lines.

BRIEF SUMMARY OF THE INVENTION

This invention aims at remedying such problems, in particular, it aims at achieving a rudder bar with a reduced master-couple and enabling to arrange thin aerodynamic lines.

To this end, this invention proposes moving the contact areas toward the interior of the rudder bar and thereby reducing the transversal bulk thereof.

More precisely, the present invention aims at a suspension rudder bar for an aircraft turbojet, having the shape of a transversal axis bar—symmetrical with respect to a plane of the turbojet crossing the engine rotation axis and parallel to a symmetry plane of the aircraft—and comprising, on the one hand, links to thrust transmission connecting rods and, on the other hand, central link means to a fastening plate. Such a rudder bar extends perpendicular to the axis of the bar with spars on both sides of the central link means. Such spars have symmetry with respect to the transversal axis, and the sides of the spars extend along a male fork joint of the plate and are associated two by two for acting as a double abutment to the fork joint.

According to particular embodiments:
  the spars of the rudder bar are substantially inscribed into triangles having an apex in the vicinity of the link to the transmission connecting rods;
  the rudder bar has a transversal bulk (TB) limited by the links to the transmission connecting rod links and an axial bulk (AB) limited by the spars inscribed in triangular apex (S) conformations located in the vicinity of the ends of the spars; and
  the spars have a symmetry with respect to the transversal axis so that the rudder bar has a <<double arrow>> conformation.

This invention also relates to an engine suspension for an aircraft turbojet with a fan hanger, provided with such a rudder bar, linked to a male fork joint of a plate for fastening to the pylon. In such a suspension, the spars of the rudder bar extend on a sufficient portion and at a determined distance from edges of the fork joint of the plate so as to be able to act as an abutment for the plate, with a suitable play, in the case of a torsion around the central link or should the connecting rod breaks.

According to particular embodiments:

the plate has an overall rectangular or isosceles trapezoid shape, drilled with holes crossed with means for fastening the plate to the pylon;

the fork joint of the plate axially crosses the rudder bar so that the end of the fork joint appears on the side of the transmission connecting rods with respect to the transversal axis of the rudder bar;

the fork joint of the plate has overall an isosceles trapezoid shape with a small base end beyond the rudder bar, between the two transmission connecting rods so that all the sides of the spars of the rudder bar extend along the male fork joint, the plate having a transversal bulk substantially similar to that of the rudder bar;

the plate and the fork joint overall have the shape of an isosceles trapezoid.

BRIEF DESCRIPTION OF THE DRAWINGS

Other aspects and advantages of the present invention will become more obvious reading the following detailed description, referring to the appended FIGS. respectively showing:

FIGS. 4a to 4d, respectively front, bottom, sideways and perspective views of another example of a rudder bar according to this invention in connection with a plate with an overall isosceles trapezoid shape.

DETAILED DESCRIPTION OF THE INVENTION

Figure 3A:
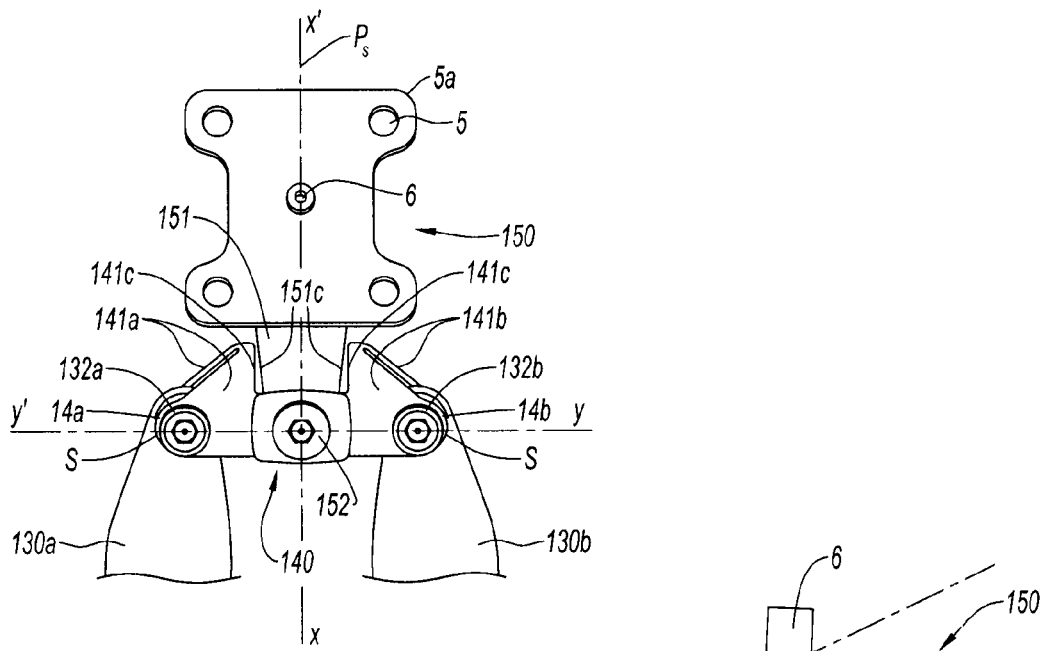
FIGS. 3a to 3c, respectively front, sideways and perspective views of a first exemplary embodiment of a rudder bar according to this invention in connection with a fastening plate and transmission connecting rods.
Figure 3B:
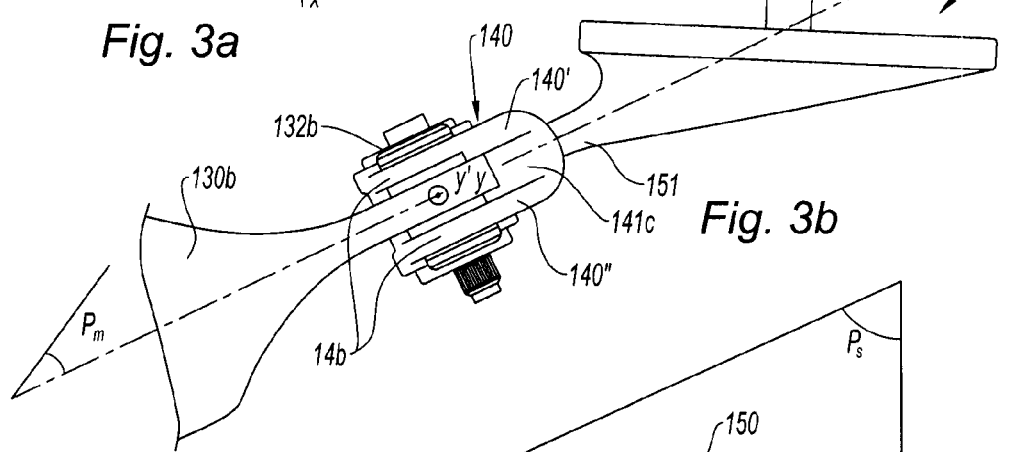
Figure 3C:
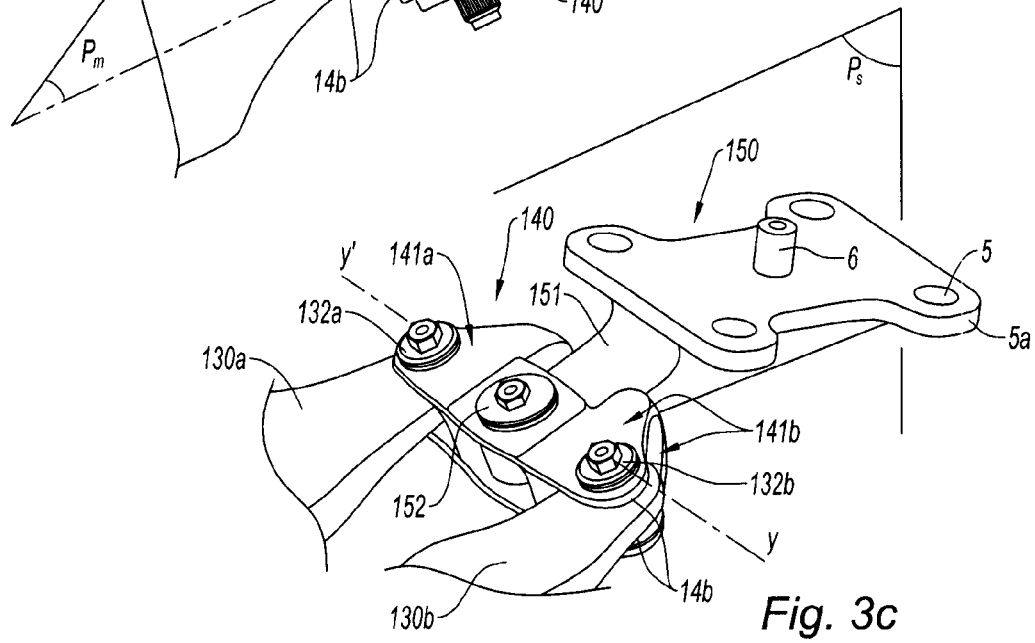

With reference to the views of FIGS. 3a to 3c, the first exemplary embodiment is illustrated of a suspension rudder bar 140 for an aircraft turbojet according to this invention, in connection with a fastening plate 150 and transmission connecting rods 130a and 130b, respectively in front, sideways and perspective views.

This rudder bar 140 has the shape of a bar with a transversal axis Y'Y, being symmetrical with respect to a plane $P_S$ of the turbojet intersecting the longitudinal rotation axis X'X of the engine, parallel to the symmetry plane of the whole aircraft. Such a rudder bar is fastened, on the one hand, to the transmission connecting rods 130a, 130b by knee links 132a and 132b and, on the other hand, to a male fork joint 151 centrally extending—in the symmetry plane $P_S$—the fastening plate 150, also via a knee link 152 in a central position on the rudder bar 140. The rudder bar 140 has a double wall 140', 140" enabling to achieve the knee links 132a, 132b, 152 on both sides of the connecting rods 130a, 130b and of the fork joint 151.

Figure 1:
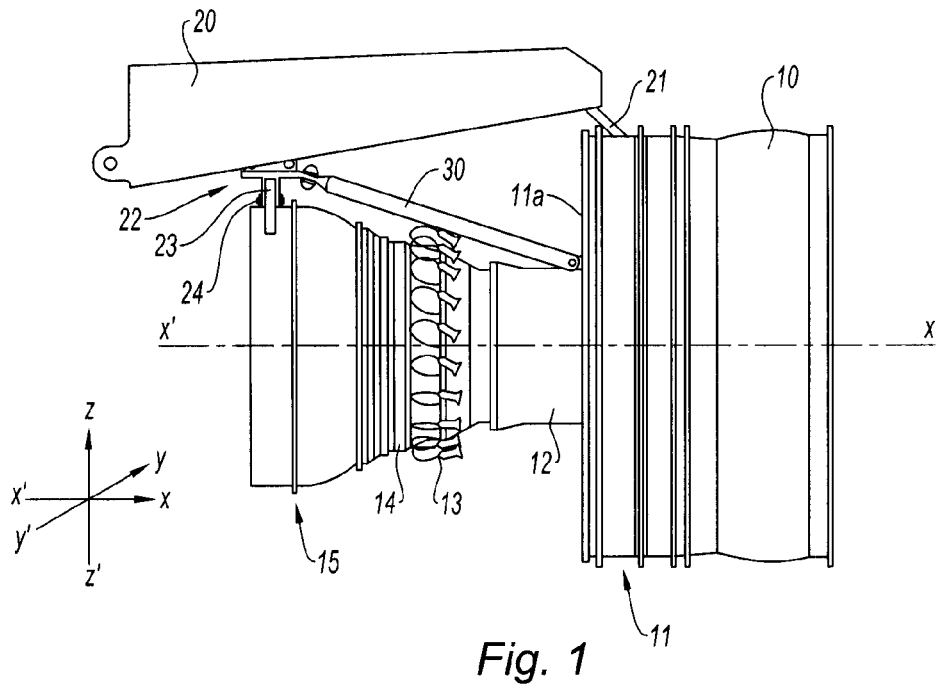
FIGS. 1 and 2, a side view of an engine suspension of a turbojet under a wing, and a top view of the linking rudder bar between the transmission connecting rods and the plate for fastening to the pylon (already set forth)
Figure 2:
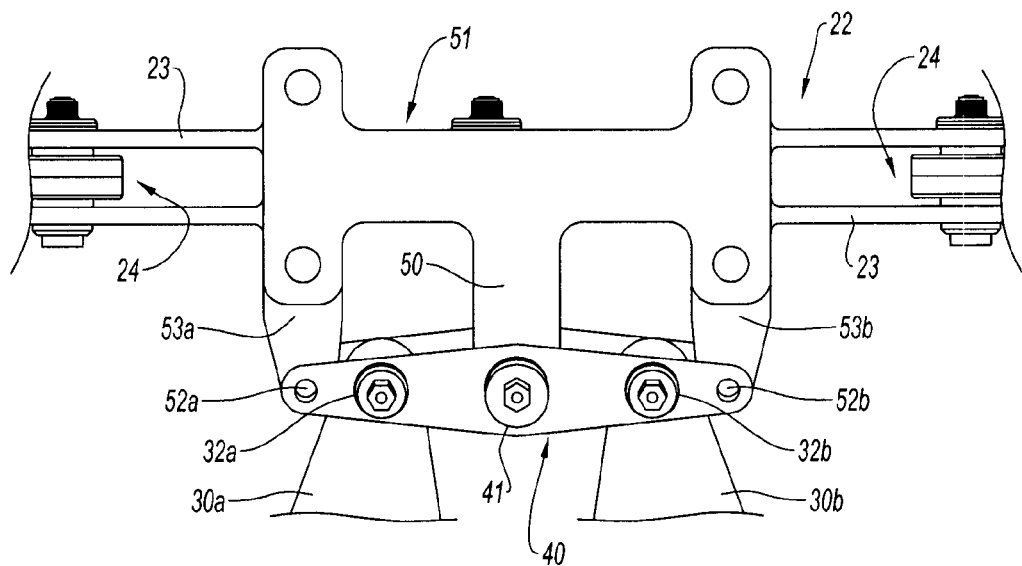

In this example, the connecting rods 130a and 130b provide the thrust transmission of the previously set forth type in reference to FIG. 1, i.e. between the hub 11a of the front casing 11 of the fan and the engine hanging pylon 20.

According to this invention, the knee links 132a and 132b between the rudder bar 140 and the transmission connecting rods 130a, 130b are arranged on the transversal ends 14a, 14b of the rudder bar 140. The rudder bar does not extend according to the axis Y'Y substantially beyond such links so that the transversal bulk (TB) thereof is reduced to a minimum. Such a reduced bulk enables to implement fine aerodynamic lines.

The transversal bulk of the rudder bar is defined as the length of the rudder bar between its transversal ends 14a and 14b. Furthermore, in the case of a problem of a connecting rod torsion or breaking, the master-couple is reduced proportionally.

From these transversal ends 14a, 14b, the rudder bar 140 extends according to both parallel walls 140' and 140" forming spars 141a and 141b, on each side of a median plane Pm containing the connecting rods 130a, 130b (see particularly FIG. 3b) along the fork joint 151. Such extensions 141a, 141b are overall perpendicular to the transversal axis Y'Y. They have a triangular shape (see in particular FIG. 3a) with, for each, a side 141c joining the two walls 140' and 140" of the rudder bar along the male fork joint 151, and an apex S coinciding with the ends 14a, 14b in the vicinity of the knee links 132a, 132b. The axial bulk of the rudder bar is the maximum length of the rudder bar along the longitudinal X'-X axis. The spars then define the axial bulk (AB) of the rudder bar.

The side 141c of the rudder bar extends along the edges 151c of the male fork joint 151 on an extent and at a distance such that the rudder bar 140 can act as an abutment for the plate 150, with a suitable play, in case of a torsion around the central link or a breaking of the connecting rod.

The plate 150 has an overall rectangular shape drilled with holes 5 in ears 5a formed at each apex so that means for fastening the plate to the pylon (not shown) can cross it. The plate further comprises longitudinally, in the plane $P_S$, a centering peg 6 for positioning the plate upon the fastening thereof, then resuming shearing the fastening screws.

Figure 4C:
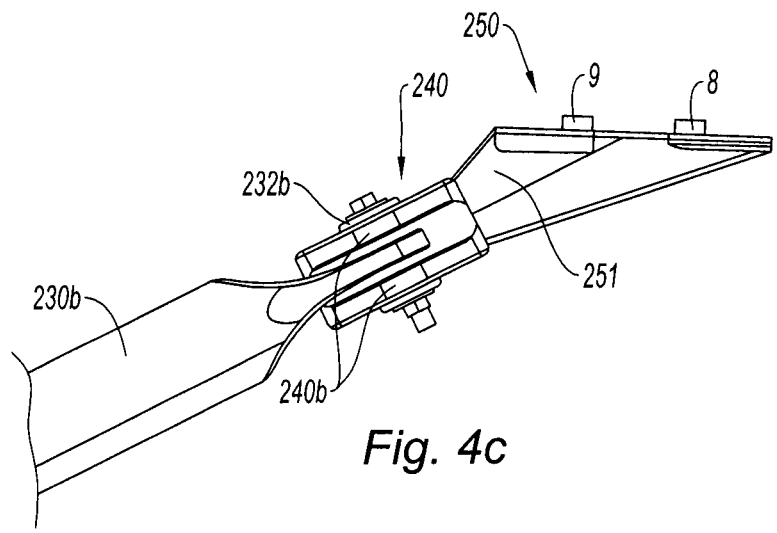
Figure 4D:
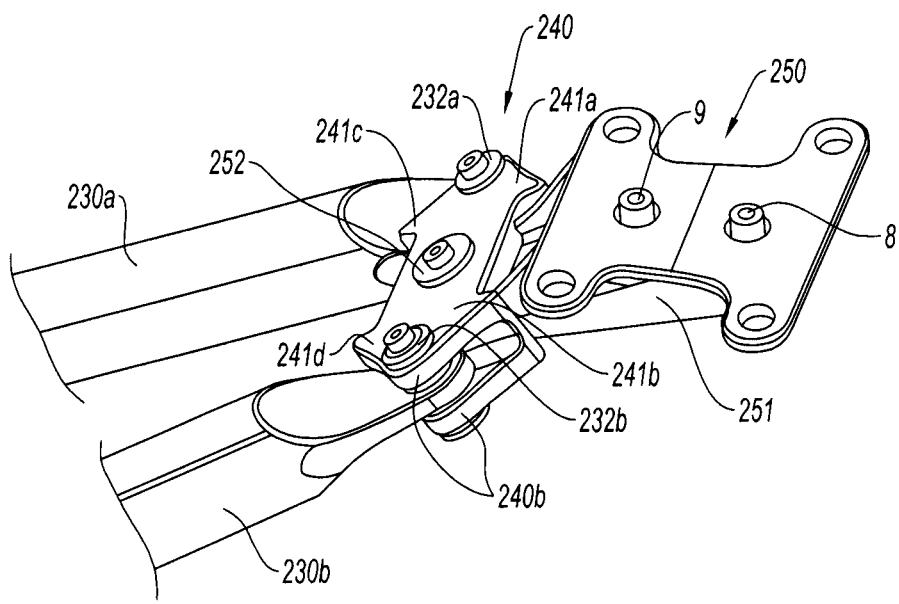

According to another exemplary embodiment, such as illustrated on FIGS. 4a to 4c, respectively showing front, bottom, sideways and perspective views, the rudder bar 240 is in connection with a plate 250, having an overall isosceles trapezoid shape, and transmission connecting rods 230a, 230b. As in the previous example, the knee links 232a and 232b with the connecting rods are formed substantially on the ends 240a and 240b of the rudder bar. In the present version, the spars of the rudder bar 241a, 241b, 241c and 241d are inserted into triangles, the apexes of which coincide with the ends 240a, 240b in the vicinity of the knee links 232a, 232b with the connecting rods 230a, 230b. The spars have a double symmetry with respect to the longitudinal symmetry plane $P_S$ and with respect to the transversal $P_T$ plane—perpendicular to the plane $P_S$ and containing the transversal axis Y'Y—so that the rudder bar 240 has here overall a <<double arrow>> configuration, with the apexes S on the end of the opposite arrows. The transversal bulk (TB-2) of the rudder bar is defined as the length of the rudder bar between its transversal ends 240a and 240b. The axial bulk (AB-2) of the rudder bar is the maximum length of the rudder bar along the longitudinal X'-X axis.

The plate 250 is extended with a male fork joint 251 connected to the rudder bar by a central knee link 252, the fork joint also extending the overall isosceles trapezoid shape of the plate 250 (see in particular FIG. 4b). The plate 250 is furthermore pierced with holes 7 in ears 7a formed at each apex of the trapezoid in order to enable means for fastening the plate to the pylon (not shown) to cross it. The plate 250 also comprises two shearing pegs 8 and 9 arranged in the longitudinal symmetry plane $P_S$ intended for resuming shearing the fastening screws for the plate 250 into the pylon. Such pegs, also taking part in centering the plate upon fastening, thereby ensure the mechanical hold of the fastening.

The small end base 253 of the male fork joint 251 appears beyond the rudder bar, between the two connecting rods 230a and 230b so that the sides 242a, 242b, 242c and 242d of the spars 241a to 241d of the rudder bar 240 extend along the male fork joint 251. The extension of these sides along the fork joint 251 and the distance to this fork joint are such that the rudder bar 240 can act as an abutment to the plate 150, as in the previous example, doubling the number of spars and thus of abutments: according to the rotation direction of the rudder bar should a problem occur (breaking or torsion), either the sides 241a and 241c are associated together in abutment, or the sides 241b and 241d are associated together in abutment.

This invention is not restricted to the described and represented embodiments. It is, for example, possible that the spars have another shape than triangular, for example convex, in particular concave. Furthermore, the plate and the fork joint could have other appropriate shapes, for example, polygonal for the plate and triangular for the fork joint. In addition, the fork joint forms with the plate in the symmetry plane $P_S$ an angle adapted to the tilt of the connecting rods with respect to the pylon. Moreover, the knee links could be substituted by any adapted linking type.

The invention claimed is:

1. A suspension rudder bar for an aircraft turbojet, having a transversal axis bar shape and comprising:
    links arranged on ends transversal to thrust transmission connecting rods; and
    a central link for a fastening plate, extending, perpendicularly to the axis of the suspension rudder bar, with spars on both sides of the central link, the spars associated two by two, having a symmetry with respect to the transversal axis,
    wherein the rudder bar comprises a first wall and a second wall,
    wherein the spars are joined by a side wall between the rudder bar first wall and the rudder bar second wall,
    wherein sides of the spars extend along sides of a male fork joint of the plate so as to act as a double abutment to the fork joint, and
    wherein the rudder bar is only connected to the fastening plate by the central link.

2. The rudder bar according to claim 1, wherein the spars are inserted substantially into triangles having an apex in the vicinity of the link with the transmission connecting rods.

3. The rudder bar according to any of claim 1 or 2, wherein the rudder bar has a transversal bulk limited by the links to the transmission connecting rods and an axial bulk limited by the spars inserted into apex triangular conformations located in the vicinity of the ends of the spars.

4. An engine suspension for an aircraft engine with fan hanger, provided with the rudder bar according to claim 1 in connection with a joint of the male fork joining the fastening plate to a pylon, the spars of the rudder bar extending in such a suspension over a sufficient portion and at a determined distance from edges of the fork joint of the plate so as to be able to act as an abutment to the plate, with a suitable play, in the case of a torsion around the central link or of a connecting rod breaking.

5. The engine suspension according to claim 4, wherein the sides of the spars of the rudder bar have an appropriate length with respect to a longitudinal edge of the male fork joint of the plate and at an appropriate distance from such an edge so that this side can act as an abutment to the fork joint.

6. The engine suspension according to any of claim 4 or 5, wherein the plate has an overall rectangular or isosceles trapezoid shape, drilled with holes crossed with means for fastening the plate to the pylon, the plate having a transversal bulk substantially similar to that of the rudder bar.

7. The engine suspension according to claim 4, wherein the fastening plate comprises at least one peg for positioning the plate upon fastening.

8. The engine suspension according to claim 4, wherein the fork joint of the plate axially crosses the rudder bar so that the end of the fork joint appears on the side of the transmission connecting rods with respect to the transversal axis of the rudder bar.

9. The engine suspension according to claim 8, wherein the fork joint of the plate has overall an isosceles trapezoid shape with a small base end beyond the rudder bar, between the two transmission connecting rods so that the sides of the spars of the rudder bar extend along the male fork joint.

10. The engine suspension according to claim 9, wherein the plate and the fork joint have overall an isosceles trapezoid shape.

* * * * *

UNITED STATES PATENT AND TRADEMARK OFFICE
CERTIFICATE OF CORRECTION

PATENT NO. : 8,622,341 B2  
APPLICATION NO. : 13/087693  
DATED : January 7, 2014  
INVENTOR(S) : Yoann Marechal Page 1 of 1

It is certified that error appears in the above-identified patent and that said Letters Patent is hereby corrected as shown below:

On the title page, Item (75), please correct Inventor Yoann Marechal's address of "Dommarie les Lys (FR)" to --Dammarie les Lys (FR)--.

In the Claims

Column 6; Claim 3, line 1: "The rudder bar according to any of claim 1 or 2, wherein" should read as --The rudder bar according to any of claims 1 or 2, wherein--.

Column 6; Claim 6, line 12: "The engine suspension according to any of claim 4 or 5," should read as --The engine suspension according to any of claims 4 or 5,--.

Signed and Sealed this  
Fifteenth Day of July, 2014

Michelle K. Lee  
*Deputy Director of the United States Patent and Trademark Office*